Figure 3:
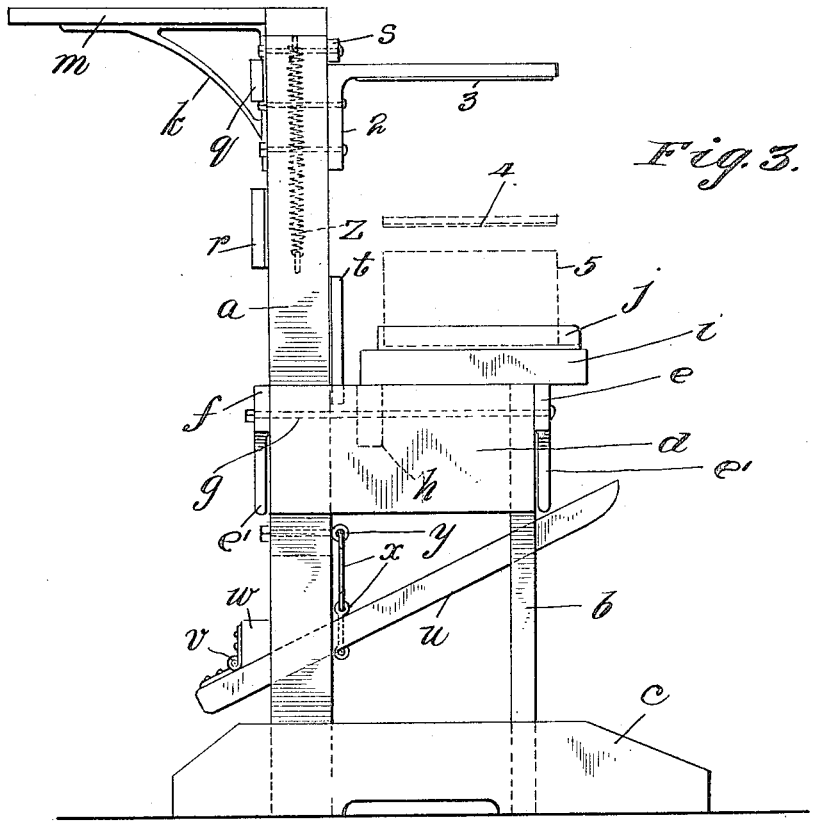

S. G. SMITH.
BOX PRESS.
APPLICATION FILED OCT. 27, 1914.
1,140,410.
Patented May 25, 1915.
2 SHEETS—SHEET 1.
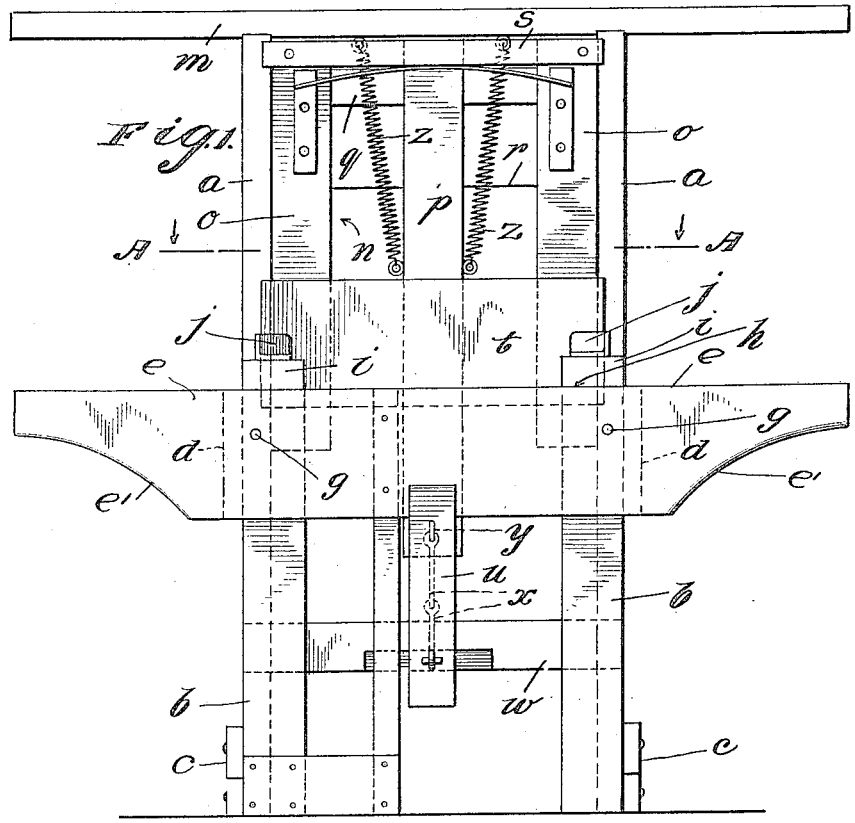
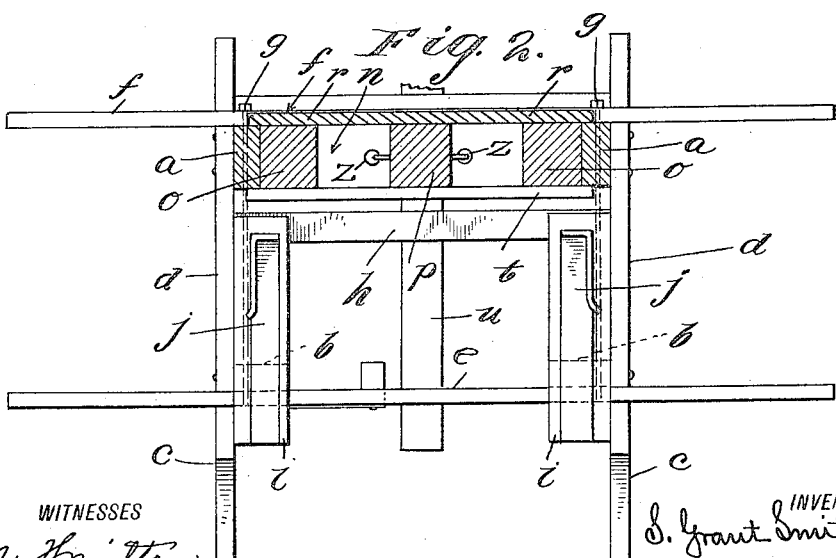
WITNESSES
M. Hamilton.
M. Reimer.
INVENTOR
S. Grant Smith
BY
James Hamilton
ATTORNEY

S. G. SMITH.
BOX PRESS.
APPLICATION FILED OCT. 27, 1914.

1,140,410.

Patented May 25, 1915.
2 SHEETS—SHEET 2.

WITNESSES
M. Hamilton
M. Reimer

INVENTOR
S. Grant Smith
BY
James Hamilton
ATTORNEY

UNITED STATES PATENT OFFICE.

S. GRANT SMITH, OF NORTH YAKIMA, WASHINGTON.

BOX-PRESS.

1,140,410.

Specification of Letters Patent.

Patented May 25, 1915.

Application filed October 27, 1914. Serial No. 868,847.

*To all whom it may concern:*

Be it known that I, S. GRANT SMITH, a citizen of the United States of America, residing at North Yakima, in the county of Yakima and Washington State, have invented certain new and useful Improvements in Box-Presses, of which the following is a specification, reference being had to the accompanying drawings.

This invention relates to improvements in box-presses; and an object of this invention is to provide a press capable of pressing and holding down the cover of a box filled with fruit (such as apples, pears and peaches), while the cover is being nailed on the box, and of thereby enabling a single workman to fasten the cover on the box quickly.

Another object of this invention consists in the provision of a press adapted to give a uniform bulge to the top of a fruit box, after the cover thereof has been nailed thereon, and to distribute any excess bulge by causing a bulge in the bottom of the fruit box.

A third object of this invention lies in the provision of a box-press adapted to produce a box the thin cover-boards of which will be free from liability of being broken in the process of bending the cover-boards over a pile of fruit projecting from the box.

A fourth object of this invention resides in the provision of a box-press of the charter hereinbefore referred to which will be simple in construction, comparatively cheap in manufacture and efficient and rapid and labor-saving in operation and use.

The boxes in which fruit (such as apples, pears and peaches) is shipped are ordinarily made of boards so thin that nailing-strips or cleats (which extend across the ends of the bottom and cover-boards) are required to prevent these thin boards in the handling of the boxes from being torn away from the nails. These cleats serve furthermore a second purpose in that, when the filled boxes are piled up, the cleats serve to hold the bottoms of the boxes out of contact with one another and thereby to relieve the fruit in the lower tiers of boxes from the weight of the superposed boxes and the contents of the latter. In packing fruit boxes, they are usually filled so that the fruit projects above the top edge of the box; and, in applying the cover or top-boards, the ends of the boards must be pressed down against the ends of the box and held there, together with the nailing cleats, while the securing nails are driven into place. To enable the securing nails to be rapidly and conveniently put into place, it is necessary to provide a box-press which will press and hold down the ends of the cover-boards, while the nailing is being done.

Figure 4:
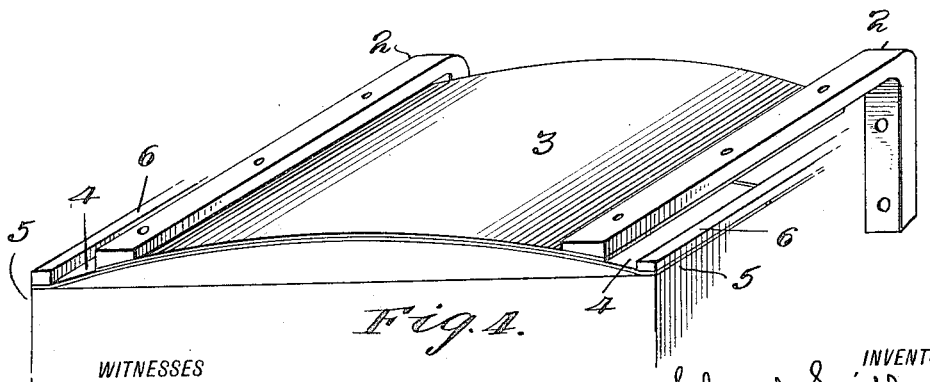

In the drawings illustrating the principle of this invention and the best mode now known to me of applying that principle, Figure 1 is a front view of my new box-press; Fig. 2 is a section on the line A—A of Fig. 1; Fig. 3 is a side view of my new box-press; and Fig. 4 is a detail showing the curved hood.

The frame of the box-press consists of a pair of side standards $a$ and a pair of legs $b$, the lower ends of the latter being connected to the lower ends of the standards $a$ by a baseboard or bottom strip $c$ and the upper ends of the legs $b$ being connected to the middle portions of the standards $a$ by side pieces $d$. The upper ends of the legs $b$ are fastened together by a horizontal cross-piece $e$ the ends of which project beyond the legs $b$ and are formed with suitable handholds $e'$; and, in rear of the box-press, the standards $a$ are likewise fastened together by a similar horizontal cross-piece $f$. By means of bolts $g$ the pieces $e$ and $f$ are held firmly in place. Obviously the press may be moved from place to place by workmen grasping the handholds $e'$ of the strips $e$, $f$. Between the latter there lies parallel therewith a cross-piece $h$ the ends of which are suitably fastened to the upper side-pieces $d$; and, on each side of the box-press, there is arranged a nailing-block $i$ the ends of which are supported by the members $e$, $h$. Upon each of the nailing-blocks $i$ there is fastened a box-guide $j$. To the top of each of the standards $a$ there is fastened a bracket $k$; and, upon these brackets $k$, there is secured a shelf $m$. The vertically-disposed traveling-frame $n$ consists of vertical members $o$, $p$, fastened together by crosspieces $q$, $r$, $s$, $t$, the crosspieces $q$, $r$, lying in rear of the standards $a$, while the crosspieces $s$, $t$, lie in front thereof; and the ends of these crosspieces bear against the standards $a$ and serve in that way to guide the frame $n$. To pull down the frame $n$, there is provided a treadle $u$ hinged at $v$ to a crosspiece $w$ the ends of which are fastened to the standards $a$. By means of links $x$, the treadle $u$ is fastened to an I-bolt $y$ which passes through the lower end of the middle vertical member $p$ of the frame n. To restore the frame to its raised or initial position, a pair of coil-springs z is provided. These springs z are fastened at their lower ends to the vertical member p and at their upper ends to the shelf m. To the vertical members o of the traveling frame there is fastened a bracket 2; and to each of these brackets there is attached one end of a curved sheet metal hood 3.

The operation of my new box-press will be readily understood from the foregoing description and may be briefly set forth as follows: The operator, by pressing down with his foot the free end of the treadle u, brings the traveling frame n with its attached hood 3 down so that the latter engages the cover-boards 4 and force the same over the fruit and into contact with the ends of the box 5, thereby leaving the workman's hands free to nail the cleats 6 over the cover-boards 4 and into the ends of the fruit-box 5; and, after this has been accomplished, the treadle u is released and the box 5 is removed.

I claim:

A fruit-box press having a traveling carriage; foot-operated means for actuating the same; and a curved hood attached to said carriage and arranged to hold down the top of the box and to impart thereto a bulge within which lies the topmost part of the fruit.

Signed at North Yakima, in the county of Yakima and State of Washington, this 21st day of October, A. D. 1914, in the presence of the two undersigned witnesses.

S. GRANT SMITH.

Witnesses:
GRACE L. SLASOR,
D. V. MORTHLAND.

Copies of this patent may be obtained for five cents each, by addressing the "Commissioner of Patents, Washington, D. C."